(12) United States Patent  
Dunleavy

(10) Patent No.: US 6,748,242 B1  
(45) Date of Patent: Jun. 8, 2004

(54) PERSONAL COMMUNICATION DEVICE WITH FULL KEYBOARD AND GAMING FEATURE

(75) Inventor: Thomas F. Dunleavy, Oxnard, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 462 days.

(21) Appl. No.: 09/632,740

(22) Filed: Aug. 4, 2000

(51) Int. Cl.[7] .............................. H04B 1/38; H04M 1/00
(52) U.S. Cl. .................. 455/566; 455/575.4; 455/90.3; 455/347
(58) Field of Search .................. 455/550.1, 566, 455/556.1, 557, 347, 348, 349, 575.1, 90.1, 575.4; 345/168, 169; 361/616, 680, 681; 379/433.11, 433.12, 433.13, 433.04

(56) References Cited

U.S. PATENT DOCUMENTS

| | | | | |
|---|---|---|---|---|
| 5,185,790 A | * | 2/1993 | Mischneko | ............ 379/433.13 |
| 6,151,012 A | * | 11/2000 | Bullister | ...................... 345/168 |
| 6,542,721 B2 | | 4/2003 | Boesen | |
| 2002/0006815 A1 | * | 1/2002 | Finke-Anlauff | ............. 455/575 |

* cited by examiner

Primary Examiner—Temica M. Davis  
(74) Attorney, Agent, or Firm—Jubin Dana; Steven A. Shaw

(57) ABSTRACT

Various embodiments of a compact personal communication device are wherein each embodiment provides a full-feature keyboard and/or gaming control. The device provides a user with voice and data communication. The device includes a display, a first unit and a second unit coupled to the display for providing the user with input controls, a first locking mechanism for engaging the first unit in the closed position to securely hold the first unit in a closed position, and a second locking mechanism for engaging the first unit in the open position in order to securely hold the first unit in an open position.

4 Claims, 3 Drawing Sheets

PERSONAL COMMUNICATION DEVICE WITH FULL KEYBOARD AND GAMING FEATURE

CROSS REFERENCE TO RELATED PATENT

This application is related to U.S. patent application Ser. No. 09/584,297; filed on May 31, 2000, entitled "Foldable keyboard for mobile communications device" now U.S. Pat. No. 6,580,932 issued on Jun. 17, 2003. The present application and said patent, at the time the claimed invention of the present application was made, were subject to an obligation of assignment to Nokia Mobile Phones Limited.

BACKGROUND

This invention generally relates to telecommunications devices and, more specifically, to a device with wireless communications with enhanced input device.

Typical cellular devices include an alphanumeric keypad with input functions and a display area. One problem faced by manufacturers of these devices is how to incorporate a full keyboard or gaming features in a limited space, and thus, maximize the key pad functions and number of features in the smallest space or volume possible. Current methods include a keypad layout with alpha and numeric properties, some type of navigational pad or dial, and various types of soft keys. Soft keys are unmarked keys positioned next to the display and, hence, soft keys derive their meaning or function from what is displayed in the display.

Even though the keypad may include some type of navigational pads or keys, the navigational keys have limited application or use. In addition to navigational keys, the keypad includes number pads. The number pads are typical numeric pads that are also used to designate or select alpha characters. For example, the numeric "2" pad can typically be used in alpha mode to represent the letters "A", "B", and "C". Accordingly, if the user wanted to select and enter the letter "C", then the user would press the numeric "2" pad three or four times until the letter "C" appeared in the display. Although inefficient, this is currently one option for entering one or two words; these alphanumeric pads are not suitable for typing more than two or three words due to the inefficiency inherent in the design nor are they suitable for use in relation to entertainment functions.

A current solution to the inefficiency of numeric pads is to include a full keyboard, such as a QWERTY keyboard. The problem face by manufacturers of personal communication devices or cellular phones is that the addition of a full keyboard or a gaming keypad results in a bulky portable device.

Another problem faced by manufactures of portable devices is how to make a device that is adaptable to the changing needs of users. The problem exists because the user may at one instant desire to use the device for voice related communication and at another instant desire to use that same device for data communication that requires a QWERTY style keyboard to input data. Consequently, the user can not easily adapt the device to the user's varying desires.

Therefore, what is needed is a compact device that is capable of adapting to the user's varying needs, which incorporates a full-feature keyboard and/or gaming control.

SUMMARY

A compact personal communication device is provided for wireless communication and entertainment that includes a full-feature keyboard and/or gaming control. The device provides a user with voice and data communication and includes a display, a first unit and a second unit coupled to the display for providing the user with input controls, a first locking mechanism for engaging the first unit in the closed position to securely holding the first unit in a closed position, and a second locking mechanism for engaging the first unit in the open position in order to securely holding the first unit in an open position.

DETAILED DESCRIPTION

Figure 1:
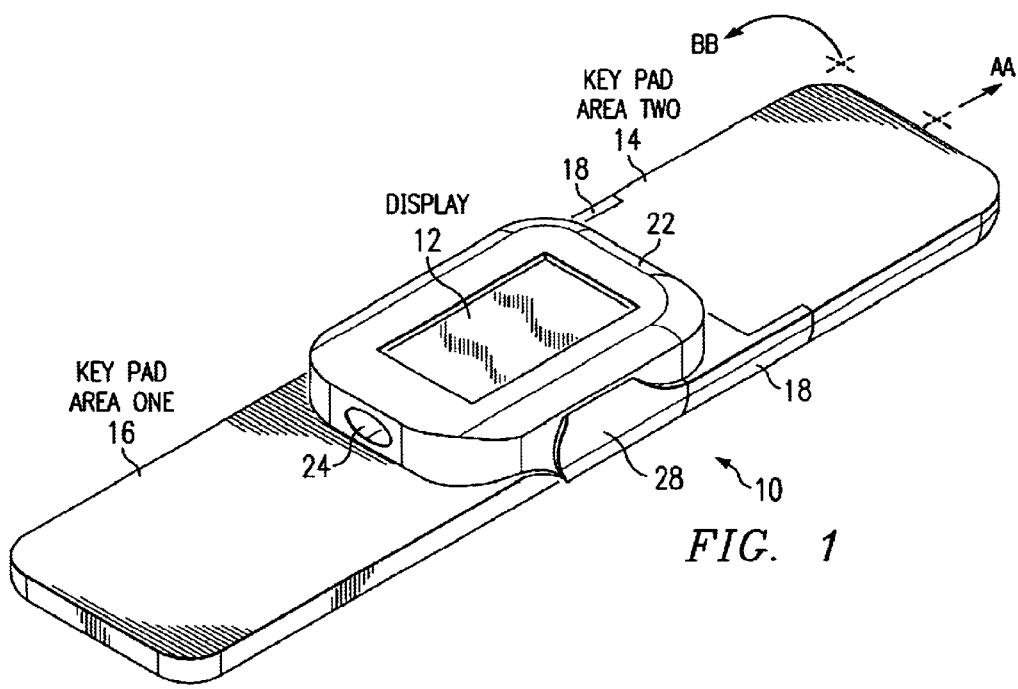
FIG. 1 is a perspective of a portable communications device in an open position in accordance with the teaching of the present invention.
Figure 2:
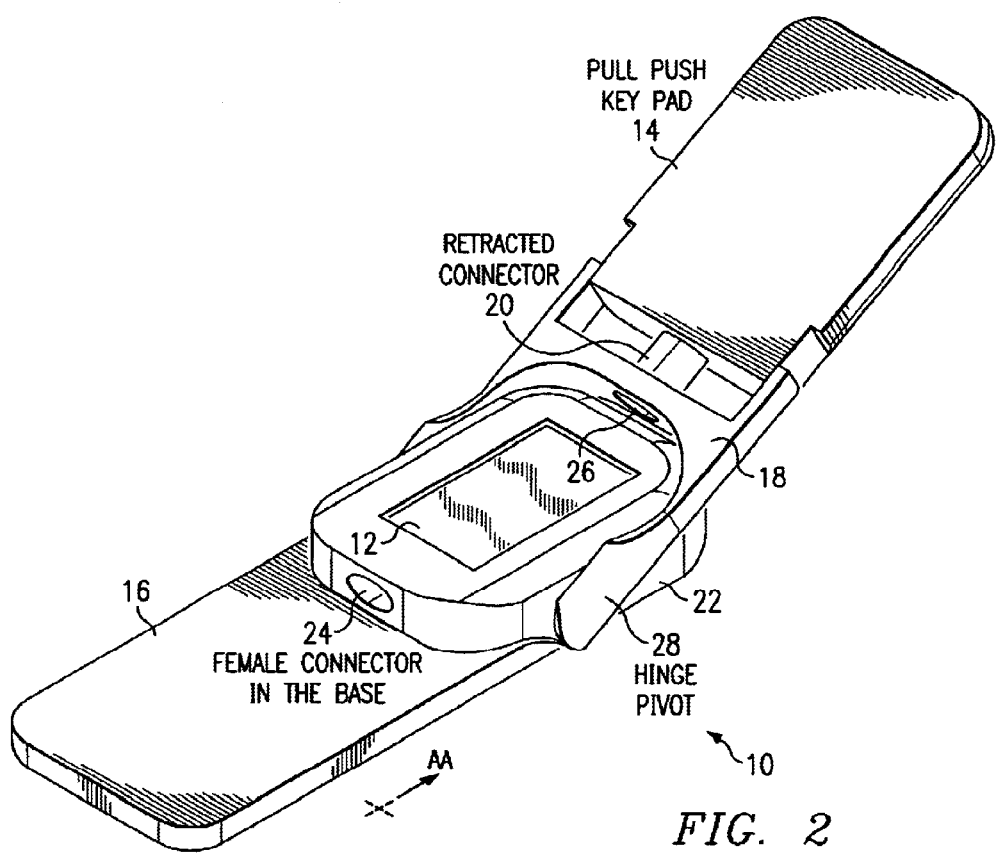
FIG. 2 is a perspective view of the device of FIG. 1 in a partially open position.
Figure 3:
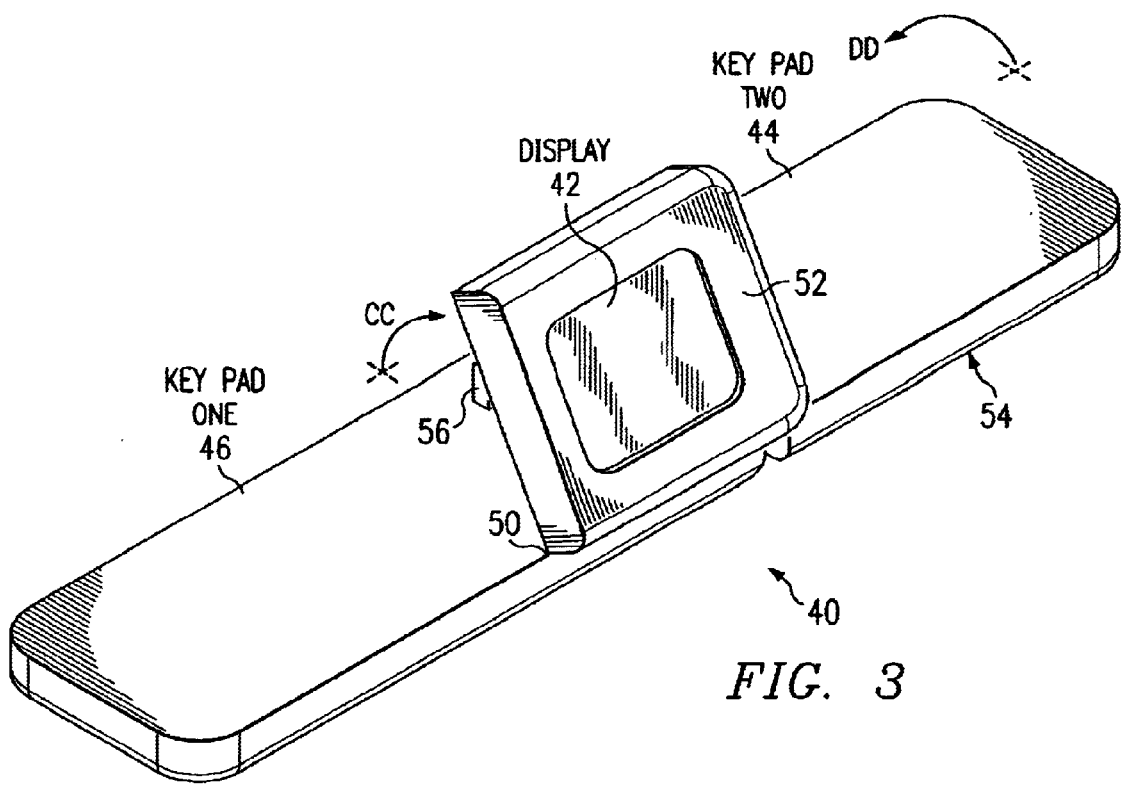
FIG. 3 is a perspective of a portable communications device in an open position in accordance with the teaching of the present invention.

Referring now to FIGS. 1 and 2, a personal communication device 10 provides a user with a dual mode cellular device with data communication capabilities in an open position as shown, or can act as a telephone in a closed position. In the closed position, the device 10 looks and operates like a standard mono-block cellular phone. When placed in the open position, the device 10 is converted into a data communications device for two hand operation, such as typing, with a full QWERTY keyboard, which typically has over 100 various input keys corresponding to function keys, the alphabet keys for upper and lower case, and various other input keys.

The device 10 includes a display 12 for visual presentation of information, such as information entered by a user using a right keypad 14 and a left keypad 16. The right keypad 14 and the left keypad 16 correspond to the right and left half, respectively, of the QWERTY keyboard, which can include navigational and numeric keys. The device 10 can be used in either a telephone mode or a data communications mode with voice communication capabilities, as needed.

In the closed position, the device 10 is a telephone with a numeric keypad located on the opposite side of the right keypad 14. To place the device 10 in the closed position and, thus, used it as a telephone, the user slidingly retracts the right keypad 14 in the direction AA. The right keypad 14 slides along reciprocating channels in an arm 18 of the device 10. By slidingly retracting the keypad 14 in the direction AA, a pin 20 disengages from an open position bore (not shown) in a housing 22, which is similar to a closed position bore 24 located on the opposite side of the housing 22 from the open position bore. Additionally, the pin 20 is reciprocatingly positioned within in a bore 26 of the arm 18.

Once the pin 20 is disengaged from the open position bore of the housing 22 then the right keypad 14 can be pivoted about 180 degrees in the direction BB about a pivot portion 28 of the arm 18 to the closed position. With the right keypad 14 pivoted about 180 degrees way to the closed position, the right keypad 14 is then slidingly moved along the channels in the arm 18 in the direction AA to insert the pin 20 in the closed position bore 24 of the housing 22.

In addition to providing a locking feature, the pin 20 also acts as a connector. Thus, control circuitry of the device 10 can recognize when the device 10 is in a closed or open position. Accordingly, the circuitry can activate the numeric keypad located on the opposite side of the right keypad 14, or the right keypad 14 and the left keypad 16 to activate a full QWERTY keyboard for data communication features of the device 10. Alternatively, the QWERTY keyboard could be enhanced to include or replaced by a full gaming keyboard with navigational, directional, and omni-directional joystick input devices.

Figure 4:
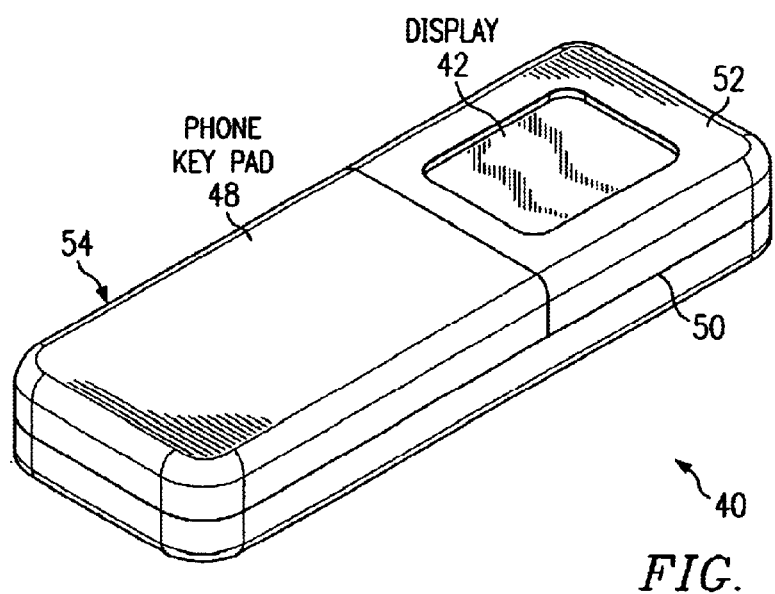
FIG. 4 is a perspective view of the device of FIG. 3 in a closed position.
Figure 5:
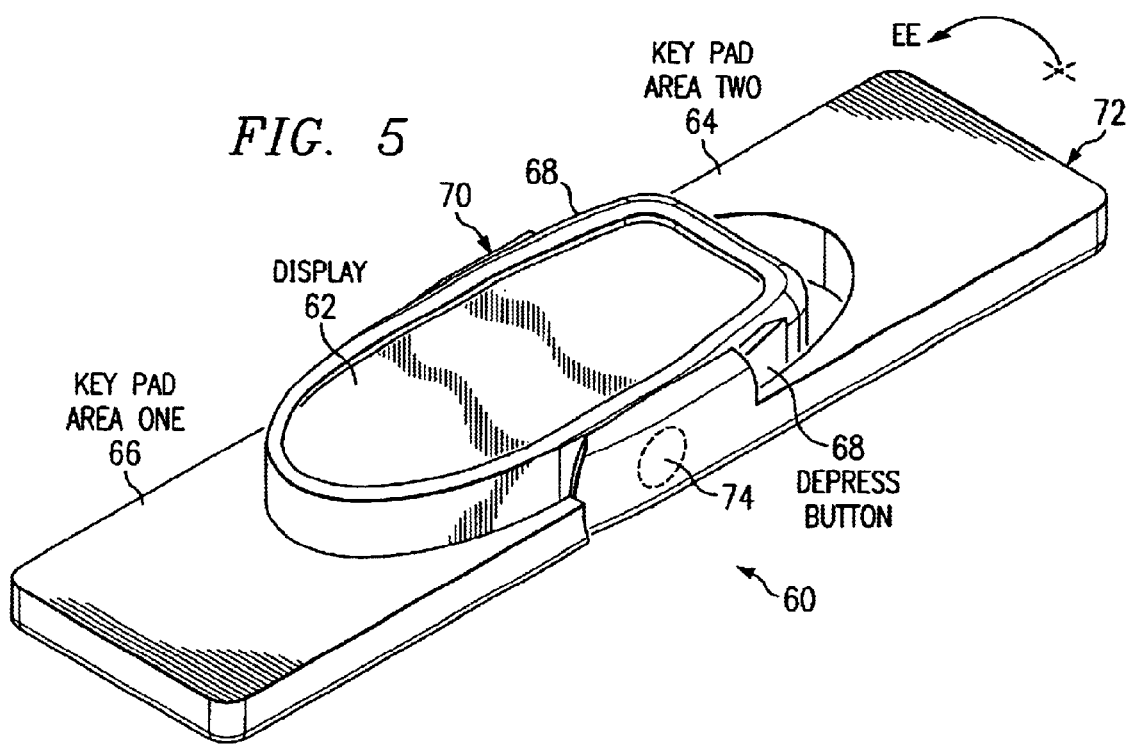
FIG. 5 is a perspective of a portable communications device in an open position in accordance with the teaching of the present invention.

Referring now to FIGS. 4 and 5, a personal communication device 40 provides the user with data communication capabilities in an open position as shown, or can act as a telephone in a closed position. When placed in the open position, the device 40 acts as a data communication device with a full QWERTY keyboard and/or a full gaming keyboard for use with gaming functionality. The device 40 includes a display 42 for visual presentation of information, such as information entered by a user using a right keypad 44 and a left keypad 46. The right keypad 44 and the left keypad 46 correspond to the right and left half, respectively, of the QWERTY keyboard or the gaming keyboard, which can include navigational and numeric keys. The device 40 can be used in either a telephone mode or a data communications mode with voice communication capabilities, as needed.

In the closed position, the device 40 is a telephone with a numeric keypad 48 located on the opposite side of the right keypad 44. To place the device 40 in the closed position in order to use the device 40 as a telephone, the user slidingly moves the right keypad 44 away from the left keypad 46 to disengage the right keypad 44 from the left keypad 46. Then the user rotates the display 42 about a hinge 50 in the direction CC. The display 42 is rotated about the hinge 50 until the display 50 is moved out of the rotational path of the right keypad 44, which is in the direction DD. With the right keypad 44 separated from the left keypad 46 and the display 42 rotated out of the travel path of the right keypad 44, the right keypad 44 is rotated about 180 degrees to a closed position. The right keypad 44 is then securely held in the closed position using a locking mechanism, such as a latch or a snap lock. The locking mechanism can also be incorporated as part of a housing 52 for the display 42. Accordingly, when the housing 52 is returned to the closed position, then a right chassis portion 54 containing the right keypad 44 and the numeric keypad 48 is held in the closed position.

In addition to providing a locking feature, when the device 40 is in the open position, then the display 42 can be secured in a tilted position by a securing bracket 56s. Thus, the display 42 can be adjusted to an angled position thereby providing better viewing and greater comfort for the user. Furthermore, with the display 42 tilted to an optimal viewing angle with respect to the position of the user, the illumination needed to illuminate the display 42 can be significantly reduced to conserve battery life.

Furthermore, the locking mechanism incorporated in the device 40 and/or tilting of the display 42 can be used to activate the corresponding features of the device 40.

Figure 6:
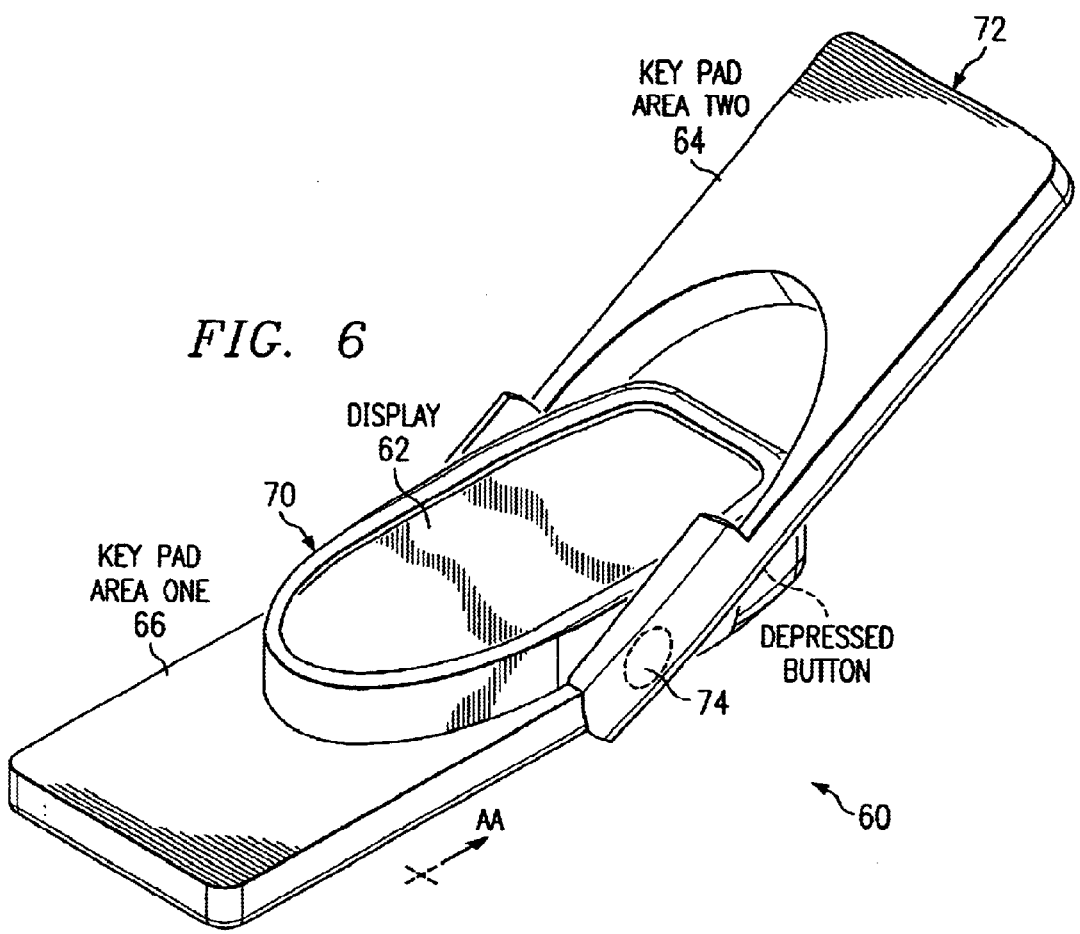
FIG. 6 is a perspective view of the device of FIG. 5 in a partially open position.

Referring now to FIGS. 5 and 6, a personal communication device 60 provides the user with data communication capabilities in an open position as shown, or can act as a telephone in a closed position. When placed in the open position, the device 60 acts as a data communication device with a full QWERTY keyboard and/or a full gaming keyboard for use with gaming functionality. The device 60 includes a display 62 for visual presentation of information, such as information entered by a user using a right keypad 64 and a left keypad 66. The right keypad 64 and the left keypad 66 correspond to the right and left half, respectively, of the QWERTY keyboard and/or the gaming keyboard, which can include navigational and numeric keys. The device 60 can be used in either a telephone mode or a data communications mode with voice communication capabilities, as needed.

Referring specifically to FIG. 5, in the closed position, the device 60 is a telephone with a numeric keypad located on the opposite side of the right keypad 64. To place the device 60 in the closed position in order to use the device 60 as a telephone, the user applied pressure to buttons 68 located on opposite sides of the housing 70. In the open position the buttons 68 engage a top surface of a chassis 72. As the user depressed the buttons 68, the chassis 72 can pivot about pivot portions 74 of the chassis 72. Once the buttons 68 are depressed then the chassis 72 can be rotated or pivoted approximately 180 degrees in the direction EE about the hinge portion 74. As the chassis 72 is rotated over the buttons 68, the buttons 68 are held in a depressed state until the chassis 72 allows the buttons 68 to return undepressed state for securing the chassis 72 in the closed position.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A personal communications device for providing a user with voice and data communication, the device comprising:

a display for visual presentation of information retained within a housing, the display pivots about a hinge to allow the display to be positioned at any position between the vertical and the horizontal with respect to the housing;

a first unit coupled to the display for providing the user with input controls, wherein the first unit pivots relative to the display about a pivot portion from an open position to a closed position;

a second unit secured and coupled to the display for providing the user with input control;

a first locking mechanism coupled to the display for engaging the first unit in the closed position for securely holding the first unit in a closed position;

a second locking mechanism coupled to the display for engaging the first unit in the open position for securely holding the first unit in an open position; and wherein the display defines a first and second bore at opposite ends therein and wherein the first unit is reciprocatingly slidable relative to the display and includes a connector pin for engaging the first and second bore in the closed position and open position, respectively, such that the first locking mechanism comprises the connector pin engaging the first bore and the second locking mechanism comprises the connector pin engaging the second bore in the open position.

2. The device of claim 1 wherein the first and second locking mechanisms comprise a pressure-release latch for releasably securing the first and second units relative to the closed and open positions.

3. A multimedia personal communication device having circuitry to provide a user with transceiver functions including information in the form of voice and data communications, the device comprising:

- a first portion coupled to the circuitry for providing the user with input control on an inside surface;
- a second portion coupled to the circuitry for providing the user with input control on an inside surface, wherein the second portion pivots relative to the first portion about a hinge from a dosed to an open position, such that in the open position the first and second portions are releasably secured in place to form a platform;
- a display coupled to the circuitry and movably secured to the first portion for visual presentation of the information, wherein the display can be pivoted relative to the platform from a first position to a second position, wherein the second position is at an angle relative to the platform and the first position is parallel to the platform; and
- wherein the display defines a first and second bore at opposite ends therein and wherein the first unit is reciprocatingly slidable relative to the display and includes a connector pin for engaging the first and second bore in the closed position and open position, respectively, such that a first locking mechanism comprises the connector pin engaging a first bore and the second locking mechanism comprises the connector pin engaging the second bore in the open position.

4. The device of claim 3, wherein at least a numeric pad is located on an outside of the second portion opposite the input control such that the user is capable of using the numeric pad for initiating voice communications.

* * * * *